US008417025B2

(12) United States Patent
Ono et al.

(10) Patent No.: US 8,417,025 B2
(45) Date of Patent: Apr. 9, 2013

(54) IMAGE PROCESSING APPARATUS AND PROGRAM RECORDING MEDIUM (75) Inventors: Yoshiki Ono, Tokyo (JP); Kazuhiro Sugiyama, Tokyo (JP); Yoshiko Kurahashi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 12/593,890

(22) PCT Filed: Aug. 17, 2007

(86) PCT No.: PCT/JP2007/066016
§ 371 (c)(1),
(2), (4) Date: Sep. 29, 2009

(87) PCT Pub. No.: WO2008/129690
PCT Pub. Date: Oct. 30, 2008

(65) Prior Publication Data
US 2010/0128978 A1 May 27, 2010

(30) Foreign Application Priority Data
Mar. 30, 2007 (JP) ................................. 2007-090647

(51) Int. Cl.
G06K 9/00 (2006.01)
(52) U.S. Cl. .......................... 382/165; 382/167; 382/274
(58) Field of Classification Search .................. 382/162, 382/165, 167, 195, 199, 205, 274
See application file for complete search history.

(56) References Cited

U.S. PATENT DOCUMENTS

| | | | |
|---|---|---|---|
| 5,999,279 A | 12/1999 | Kouzaki et al. | |
| 6,895,103 B2* | 5/2005 | Chen et al. | 382/117 |
| 2003/0002736 A1* | 1/2003 | Maruoka et al. | 382/168 |
| 2007/0229863 A1 | 10/2007 | Ono et al. | |

FOREIGN PATENT DOCUMENTS

| | | |
|---|---|---|
| JP | 64-12381 A | 1/1989 |
| JP | 8-98184 A | 4/1996 |
| JP | 9-238261 A | 9/1997 |
| JP | 2000-187722 A | 7/2000 |
| JP | 2000-348189 A | 12/2000 |
| JP | 2001-309193 A | 11/2001 |
| JP | 2004-173328 A | 6/2004 |
| JP | 2005-196252 A | 7/2005 |
| JP | 2005-341527 A | 12/2005 |
| JP | 2006-318255 A | 11/2006 |

* cited by examiner

Primary Examiner — Phuoc Tran
(74) Attorney, Agent, or Firm — Birch, Stewart, Kolasch & Birch, LLP (57) ABSTRACT The image processing apparatus according to the present invention includes a local skin color level calculating section, a local brightness deviation calculating section, and a correction amount calculating section. The local skin color level calculating section calculates, as a local skin color level, a skin color level in a predetermined local region in an image. The local brightness deviation calculating section calculates, as a local brightness deviation, a brightness dynamic range in the predetermined local region. The correction amount calculating section determines whether the predetermined local region is a skin region or not by using the local skin color level and the local brightness deviation.

24 Claims, 4 Drawing Sheets

IMAGE PROCESSING APPARATUS AND PROGRAM RECORDING MEDIUM

TECHNICAL FIELD

The present invention relates to an image processing apparatus and a program recording medium that can correct a digitalized image, and is applicable to, for example, an image processing apparatus and a program recording medium that can perform an image process in which a effect of a correction is changed between a skin region and other region other than the skin contained in an image.

BACKGROUND ART

In a conventional image processing apparatus, a correcting process similar to that for the other region has been executed to a skin region in an image. Therefore, an adverse affect from the viewpoint of image quality is given to the skin portion of a person in the image. For example, when a correction for emphasizing an outline is executed as an image process, defect such as spots, wrinkles, breakouts, or the like on a face in the image becomes noticeable. Further, when a backlight process is executed as an image process, the face in the image becomes brighter or darker, which appears odd compared to the other portions. A region of a skin of a person in an image is referred to as a "skin region" hereinbelow.

There is Patent Document 1 or Patent Document 2 as a conventional technique for solving the aforesaid problem. In the techniques disclosed in these documents, a skin region in an image is detected, wherein an amount of correction is reduced to the skin region. Thus, an adverse affect from the viewpoint of image quality to the skin region is suppressed.

Specifically, in the technique disclosed in the Patent Document 1, when detecting the skin region, an image is represented by a brightness and color difference, and a skin color level is obtained by using the color difference so as to specify the region having the high skin color level as a skin region. The image is represented by Y (brightness), Cb (color difference), and Cr (color difference), wherein the difference between Cb and Cr, which are central in a skin color, is employed as a skin color level. In the technique disclosed in the Patent Document 2, an image is represented by Y, H, and C, wherein a skin region is specified by using H (color phase), and C (color saturation).

Patent Document 1: Japanese Patent Application Laid-Open No. 2005-341527
Patent Document 2: Japanese Patent Application Laid-Open No. 2004-173328

DISCLOSURE OF THE INVENTION

Problem that the Invention is to Solve

However, in the techniques disclosed in the Patent Documents 1 and 2, a rate of erroneous determination upon detecting a skin region is increased. Even if it is determined to be a skin color, it may be a region other than a skin in most cases, so that there arises a subject to enhance precision in the detection relating to the difference in texture between a skin and a portion other than the skin.

Moreover, a difference in a process-switching level might be noticeable in a gradation part or the like, only by the determination as to whether it is a skin region or a region other than the skin.

In view of this, the present invention aims to provide an image processing apparatus and a program recording medium that can enhance precision in determining a skin region, and that can reduce a difference in a process-switching level at a gradation part.

Means for Solving the Problem

In order to attain the foregoing object, the first image processing apparatus of the present invention includes a local skin color level calculating section for calculating, as a local skin color level, a skin color level at a predetermined local region in an image; a local brightness deviation calculating section for calculating, as a local brightness deviation, a brightness dynamic range at the predetermined local region; and a skin region detecting section for detecting whether the predetermined local region is a skin region or not by using the local skin color level and the local brightness deviation.

Further, the second image processing apparatus of the present invention includes a local skin color level calculating section for calculating, as a local skin color level, a skin color level at a predetermined local region in an image; a local brightness high frequency calculating section that, when a first brightness amplitude change occurs in a first direction in the local region, and a second brightness amplitude change, which is smaller than the first brightness amplitude change, occurs in a second direction, which is generally orthogonal to the first direction, calculates a directional high-frequency component, which is an index indicating a magnitude of the first brightness amplitude change to the amount of the second brightness amplitude change; and a skin region detecting section for detecting whether the predetermined local region is a skin region or not by using the local skin color level and the directional high-frequency component.

Further, the third program recording medium of the present invention records a program onto a computer-readable recording medium, the program including a step of calculating, as a local skin color level, a skin color level at a predetermined local region in an image; a step of calculating, as a local brightness deviation, a brightness dynamic range at the predetermined local region; and a step of detecting whether the predetermined local region is a skin region or not by using the local skin color level and the local brightness deviation.

Further, the fourth program recording medium of the present invention records a program onto a computer-readable recording medium, the program including a step of calculating, as a local skin color level, a skin color level at a predetermined local region in an image; a step of calculating a directional high-frequency component, which is an index indicating a magnitude of a first brightness amplitude change to an amount of a second brightness amplitude change, when the first brightness amplitude change occurs in a first direction in the predetermined local region, and the second brightness amplitude change, which is smaller than the first brightness amplitude change, occurs in a second direction, which is generally orthogonal to the first direction; and a step of detecting whether the predetermined local region is a skin region or not by using the local skin color level and the directional high-frequency component.

Effect of the Invention

The image processing apparatus and the program recording medium of the present invention calculate the local skin color level and the local brightness deviation, and detect the skin region based on the local skin color level and the local brightness deviation.

Accordingly, the erroneous determination upon detecting the skin region can be reduced. In particular, since the skin region is detected by also using the local brightness deviation (brightness dynamic range) at the local region, the portion around the eye can be excluded from the skin region, whereby the invention provides an effect of preventing the erroneous application of a skin texture and color correction to eyes or eyelashes.

The image processing apparatus and the program recording medium of the present invention calculate the local skin color level and the directional high-frequency component, and detect the skin region based on the local skin color level and the directional high-frequency component.

Therefore, the invention provides an effect of reducing an erroneous determination upon detecting the skin region. In particular, since the skin region is detected by using also the directional high-frequency component, hairs or the like can be excluded from the skin region, whereby the erroneous application of the skin texture and color correction to hairs or the like can be prevented.

The object, feature, aspect, and advantage of the present invention will be more apparent from the detailed description below and the appended drawings.

BEST MODE FOR CARRYING OUT THE INVENTION

The present invention will specifically be described with reference to the drawings illustrating the embodiment.

Figure 1:
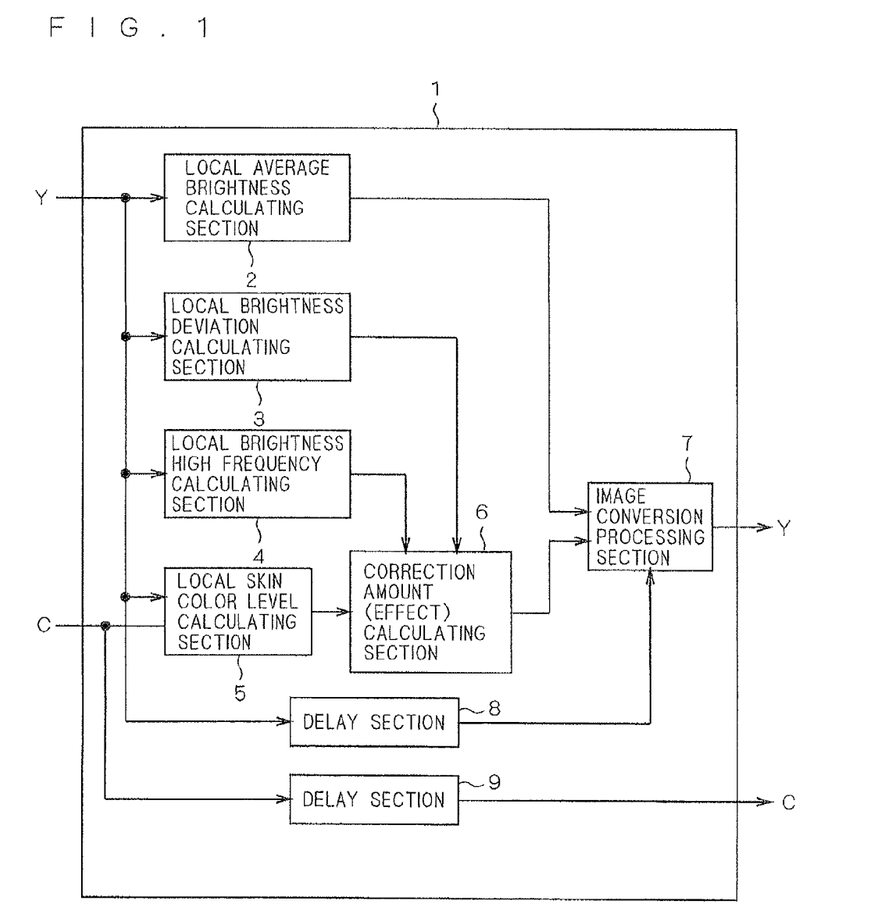
FIG. 1 is a block diagram illustrating a configuration of an image processing apparatus according to the present invention.

FIG. 1 is a block diagram illustrating the configuration of an image processing apparatus 1 according to the embodiment of the present invention.

As illustrated in FIG. 1, the image processing apparatus 1 includes a local average brightness calculating section 2, a local brightness deviation calculating section 3, a local brightness high frequency calculating section 4, a local skin color level calculating section 5, a correction amount (effect) calculating section 6, an image conversion processing section 7, a brightness signal delay section 8, and a color-difference signal delay section 9.

Among video signals inputted to the image processing apparatus 1, a brightness signal (Y) is inputted to the local average brightness calculating section 2, the local brightness deviation calculating section 3, the local brightness high frequency calculating section 4, the local skin color level calculating section 5, and the brightness signal delay section 8. Further, a color-difference signal (C) among the video signals is inputted to the local skin color level calculating section 5 and the color-difference signal delay section 9.

The average brightness at the local region (local average brightness value) is calculated at the local average brightness calculating section 2, and the calculated local average brightness value is outputted to the image conversion processing section 7.

The local region can include a predetermined-pixel-number region around a target pixel. Alternatively, a screen (image) is divided into a plurality of blocks having a predetermined size, and the block containing the target pixel may be used as the local region. Further, not only one block but also a plurality of blocks may be specified as the local region, when the screen (image) is divided into a plurality of blocks (for example, the later-described local brightness deviation may be calculated in a unit of the block).

When some value (representative value) is obtained in the local region (hereinafter referred to as "to-be-local-region"), an average value obtained from the value of each pixel including the local region, a weighed average value obtained while performing a predetermined weighing, a central value, or a value obtained in complex with these values is used.

At the local brightness deviation calculating section 3, the above-mentioned brightness dynamic range at the local region is calculated as the local brightness deviation, and the calculated local brightness deviation is outputted to the correction amount (effect) calculating section 6.

For example, when the predetermined local region includes a plurality of pixels, the maximum brightness value and the minimum brightness value of the brightness values of the pixels contained in the predetermined local region are obtained. Then, the difference between the maximum brightness value and the minimum brightness value is calculated (the result of the calculation is the brightness dynamic range at the predetermined local region).

For example, when the brightness dynamic range at the local region is calculated, the local brightness deviation calculating section 3 further divides the local region, which is the subject for the calculation, into a plurality of small regions (for example, two pixels are considered here) smaller than the local region, and the two-pixel average brightness value is obtained beforehand for each of the small regions, in order to reduce the affect of noise. Among the obtained two-pixel average brightness values of the respective small regions in the local region, the maximum two-pixel average brightness value and the minimum two-pixel average brightness value are obtained. Then, the difference between the maximum two-pixel average brightness value and the minimum two-pixel average brightness value may be calculated as the brightness dynamic range.

The reason why the affect of noise can be reduced according to the method described above is because, even if a great random noise is accidentally added to the maximum brightness value (or the minimum brightness value), the affect thereof can be reduced by obtaining the average of two pixels, for example.

At the local brightness high frequency calculating section 4, the directional high-frequency component, which becomes higher when a spatial high-frequency component in the local region has a spatial directionality, is obtained, and the obtained directional high-frequency component is outputted to the correction amount (effect) calculating section 6.

In other words, when a first brightness amplitude change occurs in a first direction in the predetermined local region, and a second brightness amplitude change, which is smaller than the first brightness amplitude change, occurs in a second direction generally orthogonal to the first direction, the local brightness high frequency calculating section 4 calculates the directional high-frequency component in the predetermined local region as an index indicating the magnitude of the first brightness amplitude change to the second brightness amplitude change. The first brightness amplitude change here means the maximum brightness amplitude change when the brightness amplitude changes in all directions of an image are obtained.

In the case described above, the directional high-frequency component can be specified as, for example, |the first brightness amplitude change|−|the second brightness amplitude change|.

Figure 2:
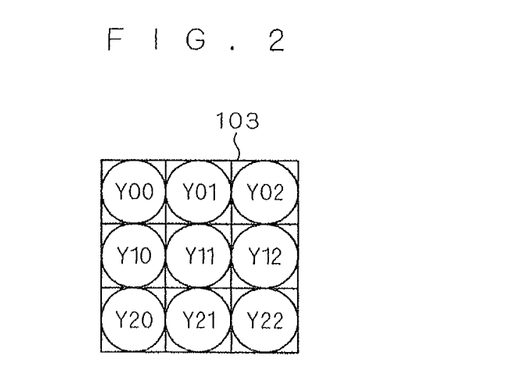
FIG. 2 is a view for explaining a method of calculating a directional high-frequency component.

For example, when the brightness value Yij ($0 \leq i \leq 2$, $0 \leq j \leq 2$) of each pixel including a rectangular region of 3-pixel×3-pixel illustrated in FIG. 2 is used, (when FIR filter (3-tap FIR filter having coefficients of −0.5, 1, −0.5) of continuous three pixels is used for determining frequencies in four directions, that is, in the longitudinal direction, in the lateral direction, and in the diagonal directions (±45 degrees)), the directional high-frequency component h is expressed by the following equation.

$$h = \max(||Y11-(Y01+Y21)/2|-|Y11-(Y10+Y12)/2||, \\ ||Y11-(Y00+Y22)/2|-|Y11-(Y02+Y20)/2||) \quad (1)$$

At the local skin color level calculating section 5, the average skin color level in the local region, for example, is calculated, and the calculated average skin color level (hereinafter referred to as local skin color level) is outputted to the correction amount (effect) calculating section 6.

The skin color level here is a value obtained from the color-difference signal Cb and the color-difference signal Cr (or the color-difference signals Cb and Cr and the brightness signal Y). The skin color level is an index indicating a so-called skin color similarity, wherein it has a high value in the case of a skin color, while it has a low value in the case of the portion other than the skin color.

For example, when the skin color level (local skin color level) is to be obtained in the local region, the average value obtained from the skin color level of each pixel (or every two pixels, or every four pixels of 2×2) including the local region, or the weighed average (weighed average) to which a predetermined weighing (for example, the weighing in which the weight increases at the center of the target block) is added, and the thus obtained value can be specified as the local skin color level.

The correction amount (effect) calculating section 6 detects whether the predetermined local region is a skin color region or not by using the local skin color level and the local brightness deviation. Alternatively, it detects whether the predetermined local region is a skin color region or not by using the local skin color level and the directional high-frequency component. Alternatively, it detects whether the predetermined local region is a skin color region or not by using the local skin color level, the local brightness deviation, and the directional high-frequency component.

Specifically, the correction amount (effect) calculating section 6 detects, as the skin region, the region where the local skin color level is higher than a first threshold value and the local brightness deviation is smaller than a second threshold value. Alternatively, it detects, as the skin region, the region where the local skin color level is higher than the first threshold value and the directional high-frequency component is smaller than the other threshold values. Alternatively, it detects, as the skin region, the region where the local skin color level is higher than the first threshold value, the local brightness deviation is smaller than the second threshold value, and the directional high-frequency component is smaller than the other threshold values.

In the case other than the above-mentioned case, it is determined that the local region is not the region (non-skin region). Each of the threshold values by which the discrimination between the skin region and the non-skin region is possible is empirically determined from a plurality of sample images.

The correction amount (effect) calculating section 6 obtains a correction amount for an image process (or, in a case where the correction effect is changed between a case in which the local skin color level is high and a case in which it is low, a correction index for changing the correction effect) that is continuously changed according to the local brightness deviation outputted from the local brightness deviation calculating section 3 (and/or the directional high-frequency component outputted from the local brightness high frequency calculating section 4) and the local skin color level outputted from the local skin color level calculating section 5, and outputs the resultant to the image conversion processing section 7.

For example, as the local skin color level is high, a correction parameter b is increased, while as the local brightness deviation is high, the correction parameter b is decreased, and as the directional high-frequency component is great, the correction parameter b is decreased.

When the local brightness deviation is defined as d ($0 \leq d \leq 255$), the directional high-frequency component is defined as h ($0 \leq h \leq 255$), and the local skin color level is defined as s ($-32 \leq s \leq 32$), the correction index (correction parameter) b ($-32 \leq b \leq 32$) can also be represented as described below.

When s>0 and d≧32, sd=s/4. When s>0 and 8≦d<32, sd=s (40−d)/32. In the cases other than the above-mentioned cases, sd=s. When s>0 and h≧8, sh=s/4. When s>0 and 2≦h<8, sh=s(10−h)/8. In the cases other than the above-mentioned cases, sh=s. Further, b=min(sd, sh).

The above-mentioned sd continuously changes with respect to the respective changes of the local skin color level s and the local brightness deviation d. The above-mentioned sh continuously changes with respect to the respective changes of the local skin color level s and the directional high-frequency component h. Accordingly, the above-mentioned sd, sh, and the correction parameter b continuously changes.

The brightness signal delay section 8 delays the brightness signal (Y) among the video signals inputted to the image processing apparatus 1 by the amount corresponding to the delay amount at the local average brightness calculating section 2 or the amount corresponding to the delay amount at the local skin color level calculating section 5 and the correction amount (effect) calculating section 6, and outputs the delayed signal to the image conversion processing section 7.

The image conversion processing section 7 determines the correction amount (or the correction effect and the correction amount) for the image process based on the local average brightness value inputted from the local average brightness calculating section 2 and the correction amount (or the index for changing the correction effect) inputted from the correction amount (effect) calculating section 6. Then, the image conversion processing section 7 performs the image process to the brightness signal (Y), which is delayed at the brightness signal delay section 8, based on the determined correction amount or the like. It is to be noted that the brightness signal (Y) that has been subject to the image process (that has been corrected) is outputted from the image processing apparatus 1.

As described later, the image conversion processing section 7 continuously corrects an image with respect to the change in the local skin color level and the change in the local brightness deviation. Alternatively, the image conversion processing section 7 continuously corrects the image with respect to the change in the local skin color level and the change in the directional high-frequency component. Alternatively, the image conversion processing section 7 continuously corrects the image with respect to the change in the local skin color level, the change in the directional high-frequency component, and the change in the directional high-frequency component.

The color-difference signal delay section 9 delays the color-difference signal (C) among the video signals inputted into the image processing apparatus 1 in order to align the brightness signal (Y), which has been subject to the image process, outputted from the image conversion processing section 7, and the phase. It is to be noted that the delayed color-difference signal (C) is outputted from the image processing apparatus 1.

Figure 3:
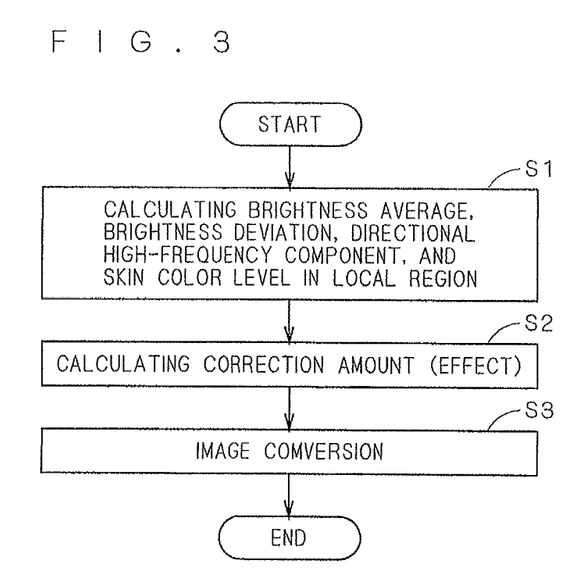
FIG. 3 is a view illustrating a flow of an operation of the image processing apparatus according to the present invention.

FIG. 3 illustrates the operation according to the embodiment of the present invention in the form of a flowchart. Specifically, the local skin color level, the local brightness deviation, the directional high-frequency component, and the local average brightness, in the predetermined local region, are calculated at the local average brightness calculating section 2, the local brightness deviation calculating section 3, the local brightness high frequency calculating section 4, and the local skin color level calculating section 5, illustrated in FIG. 1 (step S1). Next, at the correction amount (effect) calculating section 6, it is determined whether the local region is the skin region or the non-skin region by using the local skin color level, the local brightness deviation, and the directional high-frequency component, and the correction parameter b is calculated (step S2).

Then, at the image conversion processing section 7, the correcting process is performed to the brightness signal by using the correction parameter b (image conversion: step S3). Here, since the correction parameter b is obtained from the local skin color level, the local brightness deviation, and the directional high-frequency component, the image conversion processing section 7 performs the correction of the image to the brightness signal based on the local skin color level, the local brightness deviation, and the directional high-frequency component. Alternatively, the image conversion processing section 7 performs to the brightness signal by using the correction parameter b and the local average brightness value in the predetermined local region, which is the result of the calculation at the local average brightness calculating section 2 (image conversion: step S3).

Subsequently described is a case in which a gradation conversion is used, as the image conversion process (correcting process) at the image conversion processing section 7, by employing a mapping curve, illustrated in FIG. 4, in which a local contrast emphasis and a skin texture and a color correction are both achieved.

Figure 4:
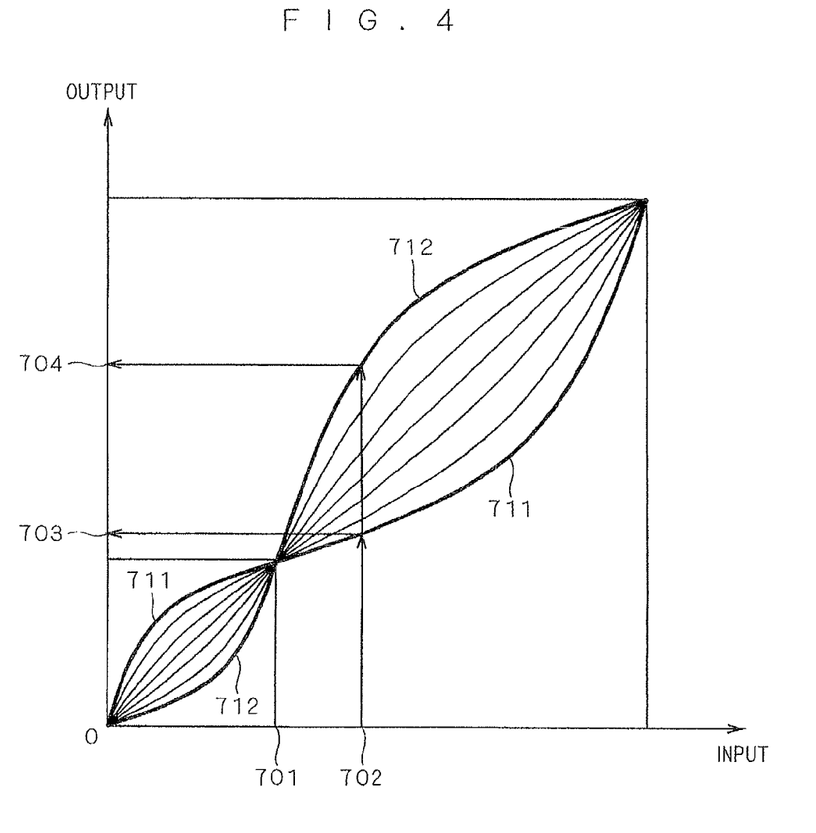
FIG. 4 is a view illustrating one example of a mapping curve.

In FIG. 4, reference symbol 701 denotes the local brightness average level. Reference symbol 702 denotes an input brightness level. Reference symbols 703 and 704 denote an output brightness level. Reference symbol 711 denotes a skin-region mapping curve. Reference symbol 712 is a non-skin-region mapping curve.

The image conversion processing section 7 continuously changes the mapping curve by using the correction amount parameter b that is outputted from the correction amount (effect) calculating section 6 and that is continuously changed. Then, the brightness signal (Y) outputted from the brightness signal delay section 8 is converted in accordance with the mapping curve. Thus, the contrast correction is executed at the local region. It is to be noted that the brightness signal (Y) after the correction is outputted from the image processing apparatus 1.

In the image process in which the correction effect is performed to the inputted brightness signal, the correction for suppressing the gradation change is executed, as the correction parameter b is high (or as the local region is determined to be the skin region). On the other hand, the correction for increasing the gradation change is executed, as the correction parameter b is low (as the local region is determined to be the non-skin region).

A contrast correction in the predetermined local region may be employed as the image process (image correction). The contrast in the predetermined local region is decreased, as the correction parameter b is high (as the local region is determined to be the skin region). On the other hand, the contrast in the predetermined local region is increased, as the correction parameter b is low (as the local region is determined to be the non-skin region).

Figure 5:
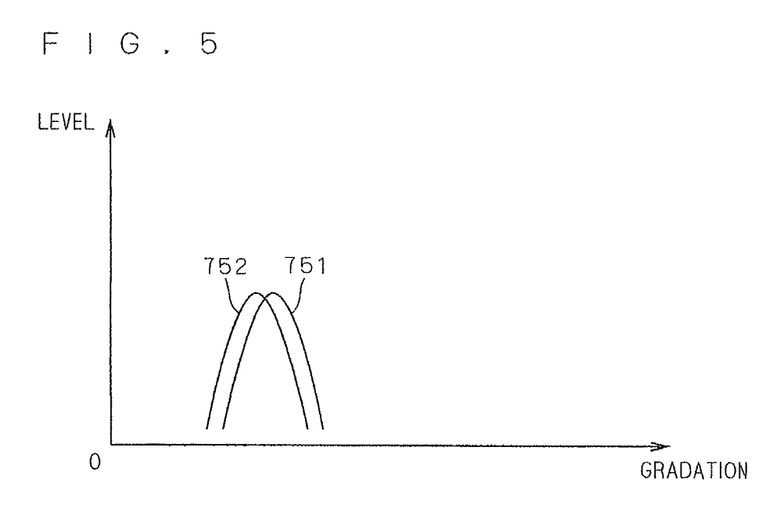
FIG. 5 is a view for explaining an effect of a correction.
Figure 6:
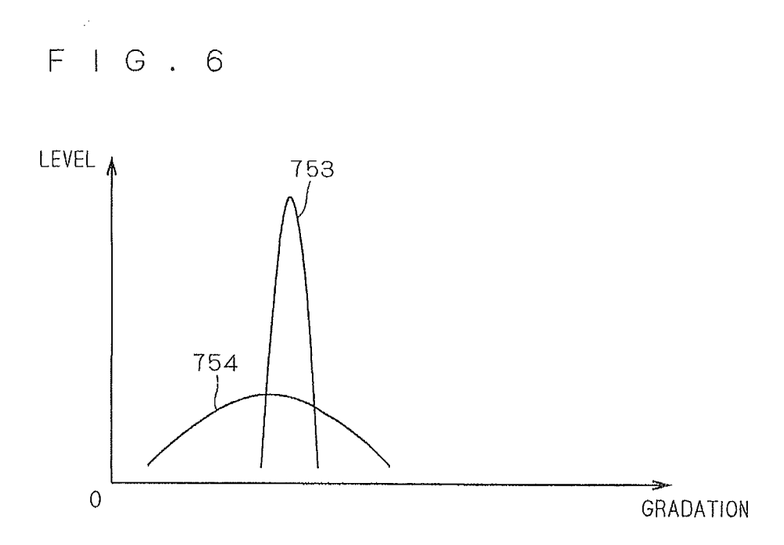
FIG. 6 is a view for explaining an effect of a correction.

In other words, the above-mentioned case is as described below. Specifically, when the correction parameter b outputted from the correction amount (effect) calculating section 6 is high (when the skin color level is high) (i.e., when the local region is determined to be the skin region), the skin-region mapping curve 711 is used. With this, the local histogram 751 before the correction in FIG. 5 may have the reduced dynamic range of the gradation (the contrast is reduced) as the histogram 753 after the correction of the skin region shown in FIG. 6. Since the contrast is reduced (the local contrast is lowered) as described above, spots, wrinkles, breakouts, or the like on a human skin can be made unnoticeable. In other words, it makes a human skin in an image look fine, thereby being capable of making the skin look nice (this correction is referred to as a skin texture and color correction).

On the other hand, when the correction parameter b outputted from the correction amount (effect) calculating section 6 is low (when the skin color level is low) (i.e., when the local region is determined to be the non-skin region), the non-skin-region mapping curve 712 is used. With this, the local histogram 752 before the correction in FIG. 5 may have the increased dynamic range of the gradation (the contrast is increased) as the histogram 754 after the correction of the non-skin region shown in FIG. 6. Since the contrast is increased (the local contrast is increased) as described above, the region other than the human skin is caused to look with increased clearness.

As understood from the above, the correcting process at the image conversion processing section 7 is performed such that the correction effect for the local region is changed between a case in which the local region is determined to be the skin region and a case in which the local region is determined to be the non-skin region. Here, the change in the correction effect is continuous with respect to the change in the local skin color level and the change in the local brightness deviation. Further, the change in the correction effect is continuous with respect to the change in the local skin color level and the change in the directional high-frequency component.

Moreover, the image processes described above are locally performed. Accordingly, the image processes that are different from each other can adaptively be performed for every region even in one screen.

The example of the local contrast emphasis and the skin texture and color correction has been described above, but a coefficient of a filter may be continuously changed. In this case, the coefficient of the filter is changed between LPF and HPF. With this, when the skin level in the local region is high, it is set to LPF so as to blur the irregularity on the skin or reduce noise. On the other hand, when the skin level on the local region is low, it is set to HPF so as to emphasize an edge.

As described above, according to the image processing apparatus 1 of the present embodiment, the skin region is detected by using not only the local skin color level in the local region but also the local brightness deviation (brightness dynamic range) in the local region. Accordingly, the erroneous determination upon detecting the skin region can be reduced.

The brightness change is sharper in an image in the vicinity of eye or eyelash than in a skin image. Therefore, when the skin region is detected by also using the local brightness deviation (brightness dynamic range) in the local region, the portion around the eye can be excluded from the skin region, whereby an effect of preventing the erroneous application of a skin texture and color correction to eyes or eyelashes is provided. Consequently, it can be prevented that the skin texture and color correction is performed to the eyes or eyelashes, thereby being capable of preventing the whole image from having a blurred impression.

The image processing apparatus 1 according to the present embodiment employs the difference between the maximum brightness value and the minimum brightness value in the local region as the local brightness deviation. Accordingly, the local brightness deviation can be obtained with a simple calculation. Consequently, the circuit scale or the program-processing amount can be reduced, whereby the production cost can be reduced, and the processing speed can be increased. Further, since the difference between the maximum brightness value and the minimum brightness value is used, it can be determined with high precision whether only a skin is included or an eye or eyelash is also included. Therefore, the skin texture and color correction to the eye or eyelash can be suppressed upon the correction.

Moreover, the image processing apparatus 1 according to the present embodiment uses, as the local region, one or a plurality of blocks that are obtained by dividing a screen (image) into a plurality of blocks. Therefore, it is unnecessary to perform the calculation of the surrounding for every one pixel, so that the calculation in a block unit may suffice. Accordingly, the local brightness deviation can be obtained while reducing the amount of the calculation. As a result, the circuit scale or the program-processing amount can be reduced, whereby the production cost can be reduced, and the processing speed can be increased, Furthermore, the image processing apparatus 1 according to the present embodiment uses the brightness value that is averaged beforehand in a region, which is smaller than the predetermined local region, in the predetermined local region when the local brightness deviation is obtained (in particular, when the maximum brightness value and the minimum brightness value in the region having a predetermined size are obtained). Therefore, the erroneous determination of the skin region due to the noise can be suppressed.

Moreover, the image processing apparatus 1 can detect the skin region by using not only the local skin color level but also the directional high-frequency component in the local region. In the case of the configuration described above, there is provided an effect of reducing the erroneous determination upon detecting the skin region.

The spatial frequency of a human hair is low in the direction in which hair grows, while it is high in the direction crossing the direction in which hair grows. Therefore, hairs or the like can particularly be excluded from the skin region by the detection of the skin region with the use of the directional high-frequency component, whereby the erroneous application of the skin texture and color correction to the hairs or the like can be prevented. Accordingly, it can be prevented that the impression of hairs being planar in an image is given.

The image processing apparatus 1 according to the present embodiment uses the equation (1) as the directional high-frequency component h. Therefore, the directional high-frequency component h can be obtained with reduced calculation amount. As a result, the circuit scale or the program-processing amount can be reduced, whereby the production cost can be reduced, and the processing speed can be increased.

It is supposed that the change in the correction-amount parameter b outputted from the correction amount (effect) calculating section 6 is discontinuous with respect to the change in the inputted brightness value or the respective color-difference values. In this case, there may be a case in which the brightness becomes greatly discontinuous during the gradation correction using the aforesaid mapping curve. Therefore, the problem in which the visual level difference is particularly increased more than the edge emphasis might arise.

In view of this, in the image processing apparatus 1 according to the present embodiment, the change in the correction-amount parameter b outputted from the correction amount (effect) calculating section 6 and the change in the mapping curve become continuous with respect to the change in the inputted brightness value or the respective color-difference values. Accordingly, the present embodiment provides an effect of reducing the level difference, which is caused by a sharp change in the correction amount or the correcting effect, at the gradation section or the like, When the local region is determined to the skin region, the image processing apparatus 1 according to the present embodiment executes a correction for suppressing the gradation dynamic range. Since the contrast is reduced (since the local contrast is reduced) with this, spots, wrinkles, breakouts, or the like on a human skin can be made unnoticeable. In other words, it makes a human skin in an image look fine, thereby being capable of making the skin look nice.

When the local region is determined to be the non-skin region, the image processing apparatus 1 according to the present embodiment executes a correction for increasing the gradation dynamic range. Since the contrast is increased (since the local contrast is increased) with this, the region other than the human skin is clearly visualized with increased unambiguity.

The present invention is applicable for the image process for the edge emphasis, for improving the local contrast, or for making a human skin look fine, which process is carried out before a digital image taken by an imaging apparatus is displayed, stored, and transmitted.

In the gradation correcting process in which the brightness correction amount is determined in local region based on the local average brightness so as to correct the brightness value based on the correction amount, it is particularly demanded that the continuity of the gradation at the gradation portion where the gradation is continuous is maintained even after the gradation correction.

For example, when a human face is detected by using a face recognition technique such as a pattern matching, and the gradation correction is performed only to the region of the detected human face with the other method, there may be a case in which the portion where the gradation becomes discontinuous is produced at the boundary between the region detected as the face and the other region.

Since the skin level that is an index of the skin region similarity is continuously changed in the present invention, smoothness of skin can be kept in the gradation region of a human skin even after the correction by applying the present invention to the gradation correcting process, whereby a significant effect can particularly be obtained. The difference at the boundary between a face and a portion other than the face is remarkable in particular.

A program including the respective steps including the flowchart illustrated in FIG. 3 may be recorded onto a computer-readable recording medium.

More specifically, a program may be recorded onto a computer-readable program, the program including a step of calculating, as a local skin color level, a skin color level at a predetermined local region in an image; a step of calculating, as a local brightness deviation, a brightness dynamic range at the predetermined local region; and a step of detecting whether the predetermined local region is a skin region or not by using the local skin color level and the local brightness deviation.

Further, a program may be recorded onto a computer-readable program, the program including a step of calculating, as a local skin color level, a skin color level at a predetermined local region in an image; a step of calculating a directional high-frequency component, which is an index indicating a magnitude of a first brightness amplitude change to an amount of a second brightness amplitude change, when the first brightness amplitude change occurs in a first direction in the local region, and the second brightness amplitude change, which is smaller than the first brightness amplitude change, occurs in a second direction, which is generally orthogonal to the first direction; and a step of detecting whether the predetermined local region is a skin region or not by using the local skin color level and the directional high-frequency component.

Since the program stored onto the program recording mediums described above is read and executed by a computer, the operation same as that of the apparatus illustrated in FIG. 1 can be made.

The present invention has been described above in detail. The aforesaid description is only illustrative in all aspects, and the present invention is not limited thereto. It is construed that enormous modifications not illustrated can be assumed without departing from the scope of the invention.

The invention claimed is:

1. An image processing apparatus comprising:
   a local skin color level calculating section for calculating, as a local skin color level, a skin color level at a predetermined local region in an image;
   a local brightness deviation calculating section for calculating, as a local brightness deviation, a brightness dynamic range at the predetermined local region; and
   a skin region detecting section for detecting whether the predetermined local region is a skin region or not by using the local skin color level and the local brightness deviation.

2. The image processing apparatus according to claim 1, further comprising:
   an image conversion processing section that corrects the image based on the local skin color level and the local brightness deviation, wherein
   the image conversion processing section corrects the image continuously with respect to the change in the local skin color level and the change in the local brightness deviation.

3. The image processing apparatus according to claim 2, wherein
   the skin region detecting section detects, as the skin region, a region where the local skin color level is higher than a first threshold value and the local brightness deviation is smaller than a second threshold value.

4. The image processing apparatus according to claim 2, wherein
   the predetermined local region includes a plurality of pixels,
   the local brightness deviation calculating section calculates the brightness value for every pixel included in the predetermined local region and can obtain the maximum brightness value and the minimum brightness value as a result of the calculation, and
   the local brightness deviation is the difference between the maximum brightness value and the minimum brightness value.

5. The image processing apparatus according to claim 4, wherein
   the local brightness deviation calculating section obtains the local brightness deviation in a unit of a block obtained by dividing the image into a plurality of blocks.

6. The image processing apparatus according to claim 4, wherein
   the local brightness deviation calculating section uses an average brightness value, which is calculated beforehand in the predetermined local region with respect to a small region having a pixel size smaller than that in the predetermined local region, when the local brightness deviation is calculated.

7. The image processing apparatus according to claim 2, wherein
   the image conversion processing section executes a correction for suppressing the gradation change in the predetermined local region, when the predetermined local region is determined to be the skin region.

8. The image processing apparatus according to claim 2, wherein
   the image conversion processing section executes a correction for increasing the gradation change in the predetermined local region, when the predetermined local region is determined not to be the skin region.

9. The image processing apparatus according to claim 2, wherein
   the image conversion processing section executes a contrast correction to the inputted brightness signal in the predetermined local region.

10. The image processing apparatus according to claim 9, wherein
    the image conversion processing section decreases the contrast in the predetermined local region when the predetermined local region is determined to be the skin region.

11. The image processing apparatus according to claim 9, wherein
    the image conversion processing section increases the contrast in the predetermined local region when the predetermined local region is determined not to be the skin region.

12. The image processing apparatus according to claim 2, further comprising:
    a local average brightness calculating section that calculates the local average brightness in the predetermined local region, wherein
    the image conversion processing section corrects the image by using the local average brightness.

13. An image processing apparatus comprising:
    a local skin color level calculating section for calculating, as a local skin color level, a skin color level at a predetermined local region in an image;
    a local brightness high frequency calculating section that, when a first brightness amplitude change occurs in a first direction in the predetermined local region, and a second brightness amplitude change, which is smaller than the first brightness amplitude change, occurs in a second direction, which is generally orthogonal to the first direction, calculates a directional high-frequency component, which is an index indicating a magnitude of the first brightness amplitude change to the amount of second brightness amplitude change; and a skin region detecting section for detecting whether the predetermined local region is a skin region or not by using the local skin color level and the directional high-frequency component.

14. The image processing apparatus according to claim 13, further comprising:

an image conversion processing section that corrects the image based on the local skin color level and the directional high-frequency component, wherein the image conversion processing section corrects the image continuously with respect to the change in the local skin color level and the change in the directional high-frequency component.

15. The image processing apparatus according to claim 14, wherein the skin region detecting section detects, as the skin region, a region where the local skin color level is higher than a first threshold value and the directional high-frequency component is smaller than a second threshold value.

16. The image processing apparatus according to claim 14, wherein when the brightness value $Y_{ij}$ ($0 \leq i \leq 2$, $0 \leq j \leq 2$) of each pixel included in a region of 3-pixel×3-pixel is used, the directional high-frequency component is expressed by $$h = \max(\|Y11-(Y01+Y21)/2|-|Y11-(Y10+Y12)/2\|,$$
$$\|Y11-(Y00+Y22)/2|-|Y11-(Y02+Y20)/2\|).$$

17. The image processing apparatus according to claim 14, wherein the image conversion processing section executes a correction for suppressing the gradation change in the predetermined local region, when the predetermined local region is determined to be the skin region.

18. The image processing apparatus according to claim 14, wherein the image conversion processing section executes a correction for increasing the gradation change in the predetermined local region, when the predetermined local region is determined not to be the skin region.

19. The image processing apparatus according to claim 14, wherein the image conversion processing section executes a contrast correction to the inputted brightness signal in the predetermined local region.

20. The image processing apparatus according to claim 19, wherein the image conversion processing section decreases the contrast in the predetermined local region when the predetermined local region is determined to be the skin region.

21. The image processing apparatus according to claim 19, wherein the image conversion processing section increases the contrast in the predetermined local region when the predetermined local region is determined not to be the skin region.

22. The image processing apparatus according to claim 14, further comprising:

a local average brightness calculating section that calculates the local average brightness in the predetermined local region, wherein the image conversion processing section corrects the image by using the local average brightness.

23. A non-transitory computer-readable recording medium having stored thereon a program, the program including:

a step of calculating, as a local skin color level, a skin color level at a predetermined local region in an image;

a step of calculating a brightness dynamic range at the predetermined local region as a local brightness deviation; and a step of detecting whether the predetermined local region is a skin region or not by using the local skin color level and the local brightness deviation.

24. A non-transitory computer-readable recording medium having stored thereon a program, the program including:

a step of calculating, as a local skin color level, a skin color level at a predetermined local region in an image;

a step of calculating a directional high-frequency component, which is an index indicating a magnitude of an amount of a first brightness amplitude change to an amount of a second brightness amplitude change, when the first brightness amplitude change occurs in a first direction in the predetermined local region, and the second brightness amplitude change, which is smaller than the first brightness amplitude change, occurs in a second direction, which is generally orthogonal to the first direction; and a step of detecting whether the predetermined local region is a skin region or not by using the local skin color level and the directional high-frequency component.

* * * * *